Oct. 27, 1925.
L. J. LEON
BIRDCAGE
Filed June 23, 1924
1,558,899
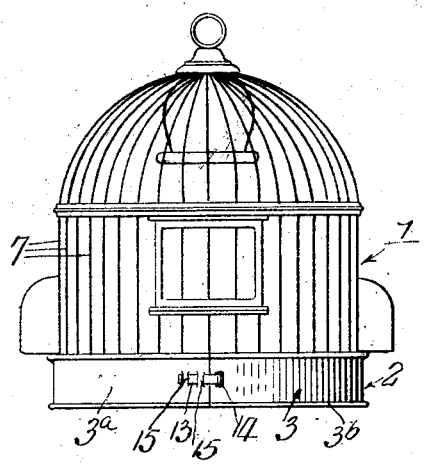
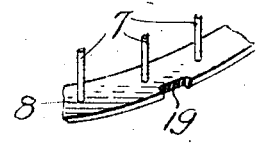
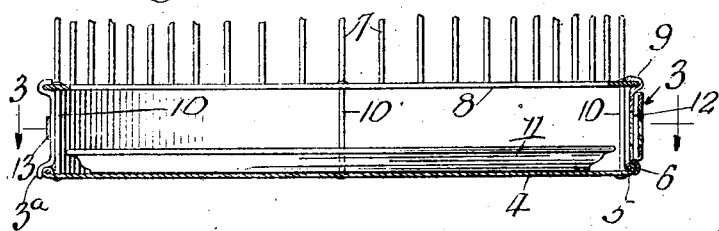
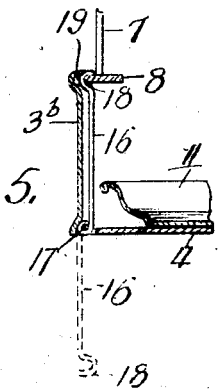
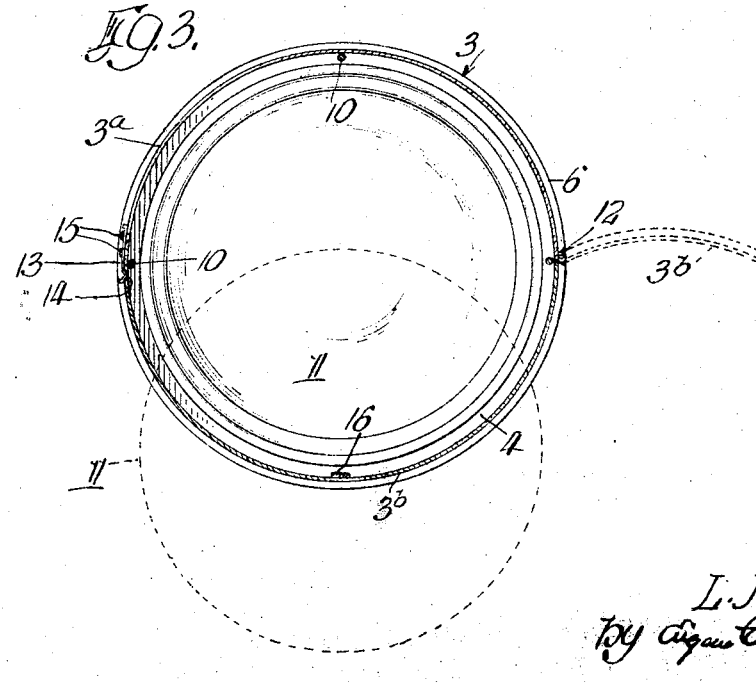
Inventor
L. J. Leon Patented Oct. 27, 1925.

1,558,899

UNITED STATES PATENT OFFICE.

LEWICKI J. LEON, OF CHICAGO, ILLINOIS.

BIRDCAGE.

Application filed June 23, 1924. Serial No. 721,676.

*To all whom it may concern:*

Be it known that I, LEWICKI J. LEON, a citizen of the United States, residing at Chicago, in the county of Cook and State of Illinois, have invented new and useful Improvements in Birdcages, of which the following is a specification.

This invention relates to bird cages and consists in the matters hereinafter described and more particularly set forth in the appended claims.

In the accompanying drawings—

Fig. 1 is a side view of a bird cage embodying the features of my invention;

Fig. 2 is a vertical sectional view through the base of the cage;

Fig. 3 is a horizontal sectional view taken on line 3—3 of Fig. 2, and indicating in dotted lines the open position of one of the sections of the marginal wall of the base; and Figs. 4 and 5 are views of details of construction to be hereinafter described.

As illustrated in Fig. 1, the cage comprises a body 1 and a base 2, both circular in form and the top of the cage body dome shape, as shown.

The base 2 has an upright marginal wall 3 and a bottom wall 4. Said bottom wall 4 is circular and flat and has a marginal bead 5 to fit within the channel formed by a bead 6 adjacent or on the lower edge of the marginal wall 3, as shown in Fig. 2.

The cage body 1 is formed of a plurality of spaced wires 7, 7 secured to a ring 8 around its lower end, as shown in Fig. 2. This ring 8 is flat and is arranged horizontal so it has an annular portion outside of the wires 7 for entering a channel formed by the bead 9 around the upper edge of the marginal wall 3. The bottom wall 4 is spaced below the ring 8 to the depth required for the base 2, and is secured to the ring 8 by a plurality of members 10, 10, preferably three in number and quarter spaced about the bottom wall 4, as shown in Fig. 3. These members 10 may be in the form of wires extending between the wall 4 and the ring 8 and secured to both. The members 10 may be continuations of certain of the wires 7 in the cage body, depending on the requirements of the manufacturer. The base 2 is designed to receive and hold a tray 11, as usual in bird cages of this type.

In order to have access into the base 2 for removal and insertion of the tray 11 without disconnecting the cage body 1 and base 2, I make the marginal wall 3 in hinged sections, as indicated in the drawings. As illustrated, this wall 3 is divided into half sections 3$^a$, 3$^b$. The section 3$^a$ is preferably fixed to the cage body and bottom wall 4 by its beads 6 and 9 clamped to the engaged parts of the bottom wall and cage body, respectively. This section 3$^a$ encircles that portion of the base including the supporting wires 10, 10, as shown in Fig. 3. The other section 3$^b$ is designed to embrace the other half of the base and is hinged by a pin or other means 12 at one end to one end of the section 3$^a$. The opposite or free end of the section 3$^b$ meets the adjacent end of the section 3$^a$ when the section 3$^b$ is closed, as shown in Figs. 1 and 3. For these ends of the sections 3$^a$, 3$^b$, a suitable releasable catch is provided to hold them closed but permitting ready opening of the section 3$^b$ when it is desired to remove the tray 11 from the base or insert it back in place. In the drawings, however, the fastener takes the form of a catch member 13 slidably carried by the section 3$^a$ on the outside and snapping into an aperture 14 in the free end of the section 3$^b$. As shown in Fig. 1, the catch member 13 is slidably held on the section 3$^b$ by extending under loops 15 struck outward from the section.

With a cage having a circular or round base, as shown in the drawings, the tray 11 is of the same shape. The opening made in the base 2 for the tray 11 must be substantially half the circumference of the base, and this opening is defined by the diametrically arranged connecting wires 10, 10 in line with the hinge pin 12 and catch member 13. The bottom wall 4 and ring 8 are normally connected together in this opening by a connecting member 16. Said member 16 is arranged midway between the hinge pin 12 and catch 13 so as to be substantially opposite the farmost wire 10, as shown in Fig. 3. Said member 16 is pivoted or hinged at 17 at one end to the bottom wall 4 and has its other end in the form of a hook 18. The member 16 when in the position shown in dotted lines in Fig. 5 opens the space for the passage of the tray 11. When the member 16 is moved into position connecting the bottom wall with the cage body, it is as in full lines in Fig. 5. There the hook 18 engages over the ring 8 of the cage body and connects the wall 4 thereto. As indicated in Fig. 4, the ring 8 has a notch or recess 19 in its outer edge to receive the hook 18 so that the hook will not project beyond the outer edge of the ring to interfere with closing the section 3^b or to make necessary a bulge therein to accommodate the hook. Thus the marginal wall 3 is of uniform contour throughout and is not unsightly as would be the case should a bulge be in it to accommodate the hook 18.

In the cage shown and described, the bottom wall 4 of the base is directly connected and carried by the cage body, yet access may be had into the base for removal of the tray 11 without disconnecting the cage body and base. Moreover, only that portion of the marginal wall 3 need be opened that is necessary to free the tray 11, this being brought about by making the wall 3 in sectional form. The depth of the cage is increased without increasing the outside height of the same, inasmuch as the full space of the base is employed by having the tray 11 rest directly on the bottom wall 4 of the base instead of being hung on the ring 8 as heretofore. This gives the bird more flying space and otherwise makes the cage larger. The construction is particularly applicable to round or circular cages, although of course not limited thereto. The marginal wall 3 being in band form facilitates its manufacture and being made in sections facilitates assembling of the cage at the time of building. The structure designed permits making the base 2 of relatively light, non-metallic material, such as pyroxylin, celluloid, or the like, and thus not only makes an article which may be easily kept clean and sanitary, but allows for bases of various colors without painting as heretofore, because the material mentioned is furnished commercially in different colors. Other and further advantages of my invention will appear to those skilled in the art to which it appertains.

While I have shown and described herein in detail a bird cage embodying the features of my invention, it is of course understood that the details of construction and arrangement of parts may be variously changed and modified without departing from the spirit and scope of my invention.

I claim as my invention:

1. A bird cage, comprising a cage body and base, the latter being circular in shape and having a surrounding annular marginal wall and a circular bottom wall, said bottom wall being spaced from the lower end of the cage body with a marginal wall closing the space between the cage body and bottom wall, said marginal wall being formed of hinged sections for opening the base through its marginal wall.

2. A bird cage, comprising a cage body and base, the latter being circular in shape and having a surrounding annular marginal wall and a circular bottom wall, said bottom wall being spaced from the lower end of the cage body with the marginal wall closing the space between the cage body and bottom wall, said marginal wall being formed of sections hinged together with one section approximately half the circumference of the base for opening the same through its marginal wall.

3. A bird cage, comprising a cage body and base, said base having a surrounding marginal wall and a bottom wall, the latter being spaced from the lower end of said cage body, members extending between the cage body and bottom wall and connecting the two together independently of said marginal wall, said members being spaced apart about the base, said marginal wall closing the space between the cage body and marginal wall and having a hinged section for opening the base through the marginal wall.

4. A bird cage, comprising a cage body and base, said base having a surrounding marginal wall and a bottom wall, the latter being spaced from the lower end of said cage body, rods extending between the cage body and bottom wall and connecting the two together, said rods being spaced about the base and being continuations of certain of the wires of the cage body, said marginal wall being outside of said rods and closing the space between the cage body and bottom wall and having a hinged section for opening the base through the marginal wall.

5. A bird cage, comprising a cage body and base, said cage body having a member surrounding the lower end thereof, said base having a surrounding marginal wall and a bottom wall, the latter being spaced from said member and connected therewith independently of said marginal wall, said marginal wall closing the space between said cage body and bottom wall and consisting of two substantially equal sections, one being fixed to said member and bottom wall and the other section being hinged to the first one for opening the base through the marginal wall.

6. A bird cage, comprising a cage body and base, the latter being circular in shape and having a surrounding annular marginal wall and a circular bottom wall, the latter being spaced from the lower end of said cage body, members extending between the cage body and bottom wall and connecting the two together independently of said marginal wall, said members being spaced apart about the base, said marginal wall closing the space between the cage body and marginal wall and having a hinged section for opening the base through the marginal wall, the member at said hinged section having hinged and releasable connection, respectively, with the cage body and bottom wall so that said member may be swung to open the space between the cage body and bottom wall on opening said hinged section.

7. A bird cage, comprising a cage body and base, said base being circular in shape and having a surrounding marginal wall and a circular bottom wall, the latter being spaced from the lower end of said cage body, rods extending between the cage body and bottom wall and connecting the two together, said marginal wall closing the space between the cage body and bottom wall and having fixed and hinged sections, the latter for opening the base through the marginal wall without separating the cage body and base, said rods being inside of the fixed section, and a member inside said hinged section and being hinged at its lower end to said bottom wall and having a hook at its upper end to releasably engage said cage body when extending between the latter and said bottom wall.

8. A bird cage, comprising a cage body and base, both circular in shape, said base having a surrounding marginal wall and a bottom wall, the latter being spaced below said cage body, a ring surrounding the cage body at its lower end and carried thereby, rods extending between said ring and bottom wall and connecting the two together, said marginal wall having a fixed and a hinged section, the latter for opening the base through its marginal wall, said rods being inside said fixed section, and a member inside said hinged section and being hinged at its lower end and having a hook at its other end to releasably engage said ring, the latter having a notch to receive said hook.

In testimony that I claim the foregoing as my invention, I affix my signature, this 20th day of June, 1924.

LEWICKI J. LEON.